US010929277B2

(12) United States Patent
Zang et al.

(10) Patent No.: US 10,929,277 B2
(45) Date of Patent: Feb. 23, 2021

(54) DETECTING HARD-CODED STRINGS IN SOURCE CODE

(71) Applicant: Citrix Systems, Inc., Fort Lauderdale, FL (US)

(72) Inventors: Bo Zang, Nanjing (CN); Tianze Jiang, Nanjing (CN); Taodong Lu, Nanjing (CN)

(*) Notice: Subject to any disclaimer, the term of this patent is extended or adjusted under 35 U.S.C. 154(b) by 0 days.

(21) Appl. No.: 16/530,310

(22) Filed: Aug. 2, 2019

(65) Prior Publication Data

US 2020/0401502 A1 Dec. 24, 2020

Related U.S. Application Data

(63) Continuation of application No. PCT/CN2019/092539, filed on Jun. 24, 2019.

(51) Int. Cl.
*G06F 9/44* (2018.01)
*G06F 21/56* (2013.01)
(Continued)

(52) U.S. Cl.
CPC .......... *G06F 11/3664* (2013.01); *G06F 8/427* (2013.01); *G06F 8/75* (2013.01);
(Continued)

(58) Field of Classification Search
CPC ... G06F 8/53; G06F 8/427; G06F 8/33; G06F 8/75; G06F 21/565; G06F 21/562;
(Continued)

(56) References Cited

U.S. PATENT DOCUMENTS 5,627,748 A * 5/1997 Baker ...................... G09G 5/00
715/210
5,704,060 A * 12/1997 Del Monte ............. H03M 7/30
(Continued)

FOREIGN PATENT DOCUMENTS

CN 102707948 A 10/2012
CN 103218290 A 7/2013

OTHER PUBLICATIONS

Xiaoyin Wang et al., TranStrL: An Automatic Need-to-Translate String Locator for Software Internationalization , 2009 IEEE, [Retrieved on Sep. 29, 2020]. Retrieved from the internet: <URL: https://ieeexplore.ieee.org/stamp/stamp.jsp?tp=&arnumber=5070554> 4 Pages (555-558) (Year: 2009).*

(Continued)

*Primary Examiner* — Anibal Rivera

(57) ABSTRACT

Methods and systems for detecting hard-coded strings in source code are described herein. According to an aspect of an example method, a first list of strings may be generated via a processor. The first list of strings may include strings that are embedded in source code of an application. A second list of strings may be generated. The second list of strings may include strings that are rendered via a user interface of the application. Each string of the first list of strings may be compared against the strings of the second list of strings. Based on the comparison, a filtered list of strings may be generated by removing, from the first of strings, at least one string that does not have a match in the second list of strings. By this method, the software development process, and especially updating, maintaining, and localizing code, may become more efficient and cost-effective.

20 Claims, 10 Drawing Sheets

(51) Int. Cl.
*G06F 9/448* (2018.01)
*G06F 11/36* (2006.01)
*G06F 8/75* (2018.01)
*G06F 8/41* (2018.01)
G06F 8/53 (2018.01)
G06F 16/951 (2019.01)
G06F 16/901 (2019.01)
G06F 8/33 (2018.01)

(52) U.S. Cl.
CPC ............... *G06F 8/33* (2013.01); *G06F 8/53* (2013.01); *G06F 11/3604* (2013.01); *G06F 11/3608* (2013.01); *G06F 16/901* (2019.01); *G06F 16/951* (2019.01)

(58) Field of Classification Search
CPC ......... G06F 21/54; G06F 21/52; G06F 9/454; G06F 16/90344; G06F 16/90; G06F 16/901; G06F 16/835; G06F 16/35; G06F 16/3322; G06F 16/951; G06F 16/258; G06F 16/221; G06F 11/3604; G06F 11/3608; G06F 11/36; G06F 11/3664; G06F 21/577; G06F 21/22; G06F 9/44589
See application file for complete search history.

(56) References Cited

U.S. PATENT DOCUMENTS

| | | | | |
|---|---|---|---|---|
| 5,799,299 A * | 8/1998 | Fujiwara | ............ | G06F 16/90344 |
| 5,819,303 A * | 10/1998 | Calhoun | ................. | G06F 9/454 |
| | | | | 715/264 |
| 5,850,480 A * | 12/1998 | Scanlon | ................. | G06K 9/723 |
| | | | | 382/229 |
| 6,886,115 B2 * | 4/2005 | Kondoh | .................... | G06F 8/33 |
| | | | | 714/52 |
| 7,103,875 B1 * | 9/2006 | Kaneko | .................... | G06F 9/454 |
| | | | | 717/125 |
| 7,822,598 B2 * | 10/2010 | Carus | ..................... | G06F 40/30 |
| | | | | 704/9 |
| 9,092,447 B1 * | 7/2015 | Anderson | ................. | G07F 7/04 |
| 9,824,139 B2 * | 11/2017 | Lim | ..................... | G06F 16/338 |
| 10,191,726 B2 * | 1/2019 | Peterson | ............... | G06F 21/563 |
| 10,528,731 B1 * | 1/2020 | Syme | ..................... | G06F 21/563 |
| 2005/0143928 A1 * | 6/2005 | Moser | ..................... | G16B 30/00 |
| | | | | 702/19 |
| 2008/0065639 A1 * | 3/2008 | Choudhary | ............... | G06F 7/02 |
| 2009/0037830 A1 * | 2/2009 | Kulkarni | ................. | G06F 9/454 |
| | | | | 715/764 |
| 2009/0113550 A1 * | 4/2009 | Costa | ...................... | G06F 21/52 |
| | | | | 726/25 |
| 2009/0148048 A1 * | 6/2009 | Hosomi | .................. | G06F 16/35 |
| | | | | 382/190 |
| 2010/0125594 A1 * | 5/2010 | Li | ...................... | G06F 16/90344 |
| | | | | 707/758 |
| 2010/0281030 A1 * | 11/2010 | Kusumura | ............ | G06F 16/835 |
| | | | | 707/741 |
| 2010/0325620 A1 * | 12/2010 | Rohde | ................. | G06F 9/44589 |
| | | | | 717/154 |
| 2010/0333201 A1 * | 12/2010 | Haviv | ................... | G06F 21/577 |
| | | | | 726/22 |
| 2012/0159625 A1 * | 6/2012 | Jeong | ..................... | G06F 21/562 |
| | | | | 726/23 |
| 2012/0233584 A1 * | 9/2012 | Ivancic | ..................... | G06F 8/51 |
| | | | | 717/104 |
| 2012/0310648 A1 * | 12/2012 | Shimizu | ................ | G06F 40/211 |
| | | | | 704/257 |
| 2014/0283096 A1 * | 9/2014 | Neerumalla | ............ | G06F 21/54 |
| | | | | 726/26 |
| 2015/0135166 A1 * | 5/2015 | Tarlow | ....................... | G06F 8/75 |
| | | | | 717/125 |
| 2015/0254255 A1 * | 9/2015 | Trivedi | ................. | G06F 16/221 |
| | | | | 707/723 |
| 2015/0310207 A1 * | 10/2015 | Park | ....................... | G06F 21/562 |
| | | | | 726/23 |
| 2016/0335057 A1 * | 11/2016 | Teodorescu | ........... | G06F 16/162 |
| 2017/0026392 A1 * | 1/2017 | Li | .......................... | G06F 16/951 |
| 2017/0169228 A1 * | 6/2017 | Brucker | ................. | G06F 21/577 |
| 2017/0329697 A1 * | 11/2017 | Dillinger | .............. | G06F 11/3608 |
| 2018/0107580 A1 * | 4/2018 | Zhang | ................. | G06K 9/00442 |
| 2018/0107724 A1 * | 4/2018 | Ganjam | .................. | G06F 16/258 |
| 2018/0129662 A1 * | 5/2018 | He | ............................ | G06F 16/258 |
| 2019/0056919 A1 * | 2/2019 | Pan | ........................ | G06F 16/901 |
| 2019/0079754 A1 * | 3/2019 | Makkar | ................. | G06N 5/022 |

OTHER PUBLICATIONS

Muzammil Shahbaz et al., Automated Discovery of Valid Test Strings from the Web Using Dynamic Regular Expression Collation and Natural Language, 2012, [Retrieved on Sep. 29, 2020]. Retrieved from the internet: <URL: https://ieeexplore.ieee.org/stamp/stamp.jsp?tp=&arnumber=6319228> 10 Pages (79-88) (Year: 2012).*

Mar. 12, 2020—(PCT) International Search Report and Written Opinion—App. PCT/CN2019/092539. pp. 1-9.

* cited by examiner

```
function onListening() {
    var addr = server.address();
    debug('Listening on ' + addr);
}
```

FIG. 8A

```
- body:      [
    + VariableDeclaration (type, start, end, declarations, kind)
    - ExpressionStatement (
          type: "ExpressionStatement"
          start: 70
          end: 100
        - expression: CallExpression (
              type: "CallExpression"
              start: 70
              end: 99
            + callee: Identifier {type start, end, name}
            - arguments:      [
                - BinaryExpression (
                      type: "BinaryExpression"
                      start: 76
                      end: 98
                    - left: Literal (
                          type: "Literal"
                          start: 76
                          end: 91
                          value: "Listening on "
                          raw: "'Listening on '"
                      )
                      operator: "+"
                    - right: Identifier (
                          type: "Identifier"
                          start: 94
                          end: 98
                          name: "addr"
                      )
                )
              ]
          )
      )
]
```

FIG. 8B

DETECTING HARD-CODED STRINGS IN SOURCE CODE

CROSS-REFERENCE TO RELATED APPLICATIONS

This application claims priority to Chinese PCT Application No. PCT/CN2019/092539, filed Jun. 24, 2019, titled Detecting Hard-Coded Strings In Source Code, which is hereby incorporated by reference in its entirety.

FIELD

Aspects described herein generally relate to software application development. More particularly, aspects the present disclosure relate to detection of hard-coded strings in source code.

BACKGROUND

Software development involves developers writing human-readable source code that consists of various elements such as identifiers, functions, variables, operators, and literals. The source code will then eventually be compiled and translated into machine code. However, including fixed string values, also known as string constants or string literals, directly in source code—the practice widely known as "hard coding"—is typically considered a bad practice because it renders the code more difficult to maintain and less adaptable especially for the purpose of localizing the software for a foreign market.

However, the practice of hard coding is difficult to completely prevent in practice, and it may be difficult to identify instances of hard-coded strings especially in large software development projects that involve millions of lines of source code spanning across thousands of files. An instance of a hard-coded string may not be discovered until a late phase in the software development cycle (e.g., while conducting a post-production quality assurance test), or worse yet, discovered by a consumer of the product after deployment. Conventional static code analysis tools may be able to automatically detect some hard-coded string candidates but these tools are also prone to producing many more false-positive results. Therefore, it would be beneficial to have an automated tool that can analyze source code and efficiently and accurately recognize hard-coded strings.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

The present specification is directed towards devices, systems, and methods for automated detection of hard-coded strings in source code.

According to an aspect of an example embodiment, a first list of strings may be generated via a processor. The first list of strings may include strings that are embedded in source code of an application. A second list of strings may also be generated. The second list of strings may include strings that are rendered via a user interface of the application. The first list of strings may be a suspected list of strings while the second list of strings may be a valid list of strings. Each string of the first list of strings may then be compared against the strings of the second list of strings. Based on this comparison, a filtered list of strings may be generated by removing, from the first of strings, at least one string that does not have a match in the second list of strings.

Generating the second list of strings may be accomplished by using a crawler, an automation framework, and/or a hook to extract the strings that are rendered via the user interface of the application.

Generating the first list of strings may be accomplished by generating an abstract syntax tree (AST) based on the source code, and analyzing the AST to identify the strings that are embedded in the source code.

Generating the first list of strings may be accomplished by filtering out, from the strings embedded in the source code, at least one false-positive string that does not satisfy grammatical criteria.

The filtered list of strings may include at least part of the strings that are embedded in the source code and rendered via the user interface.

Generating the first list of strings may be accomplished by filtering out, from the strings embedded in the source code, at least one false-positive string that is used in an internal message of the application. The internal message may be a debug message, an error message, a log message, an exception, a comment, and/or a parameter.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 8A illustrates an example code snippet, based on which an abstract syntax tree (AST) is generated.

FIG. 8B illustrates an example AST.

DETAILED DESCRIPTION

Figure 1:
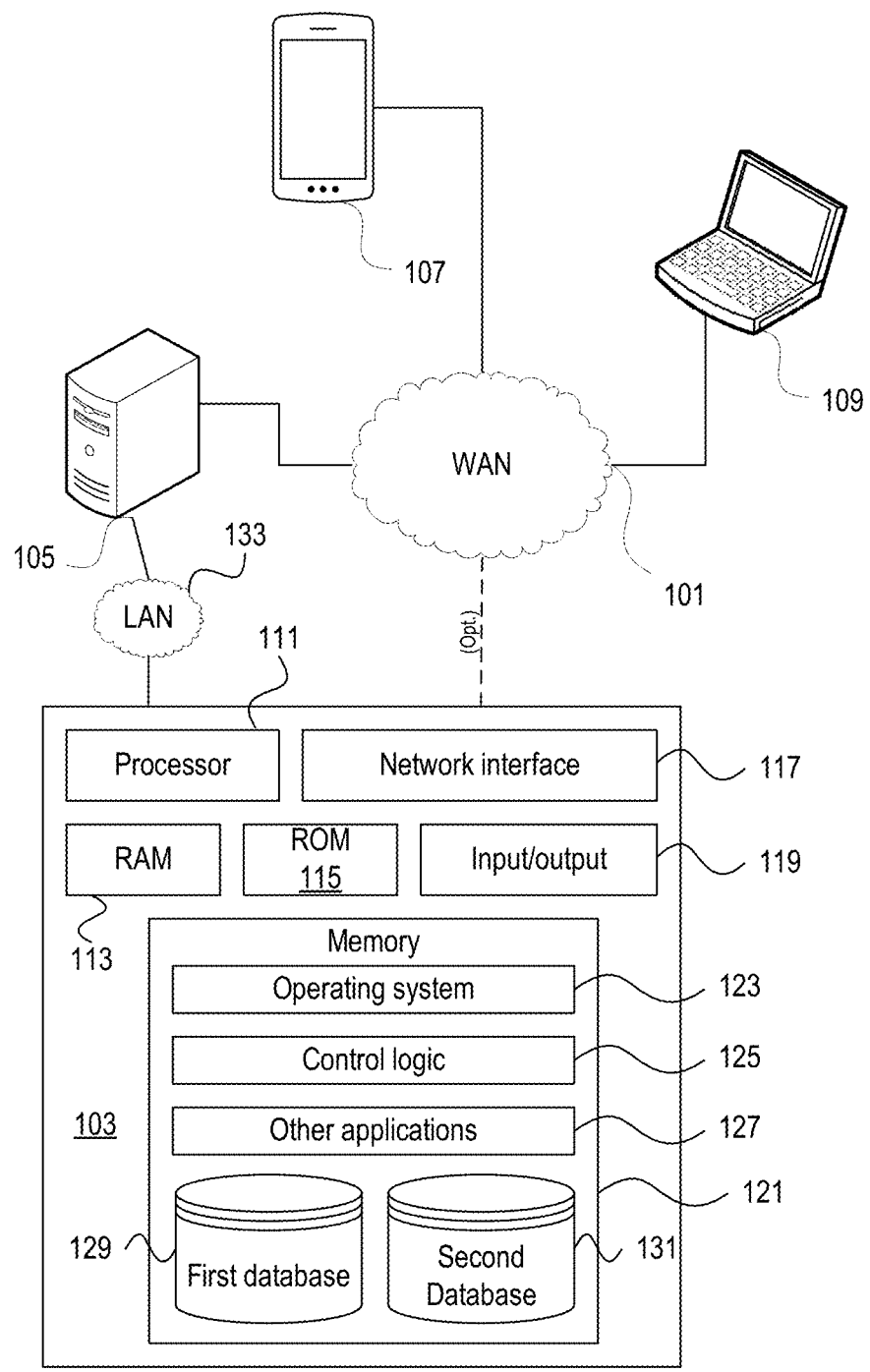
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are related to detection of hard-coded strings within source code. In particular, a suspected list of string literals may be collected from source code of an application. The suspected list may be filtered through a grammar check and further by a comparison with a valid list of strings extracted, in runtime, from the actual UI views of the application. False-positive results (e.g., internal application messages that do not cause concern for the developers) may be culled out to increase the accuracy of the detection. By automating the process of hard-code string detection, the development process may be more streamlined and the cost of maintaining, updating, and adapting the code may be decreased. Moreover, the overall user experience of using the localized version of the software may improve because fewer or no instances of inconsistent translation may be spotted by the end-user.

As used throughout this disclosure, the term "string" may refer to a sequence of characters (e.g., numbers, letters, symbols, etc.). A string may be represented digitally according to a particular character encoding scheme (e.g., ASCII, Unicode, etc.), and stored as a data structure. A string may be variously referred to as "text," "text string," "string asset," "text asset," etc. throughout this disclosure. As represented in source code, a string may be surrounded by a set of single or double quotation marks.

The term "literal" may refer to a notation of representing a fixed value in source code. A string literal (also referred to as "string constant") may be a literal of the string type.

The term "hard coding" (also stylized as "hard-coding" or "hardcoding") and its variants may broadly refer to the practice or product of embedding data directly into the source code of software. Thus, hard coding is different from obtaining the data from an external source (e.g., a resource file, a library, a user input, etc.) or generating the data at run-time. More specifically, hard coding may refer to the practice or product of embedding a string literal into the source code. Hard-coded strings or string literals may include not only text that is displayed or otherwise exposed to the user (especially the end-user) via a user interface (UI), but also other types of text that is not necessarily exposed to the user such as a debug message, an error message, a log message, an exception, a comment, a parameter, etc. Of special interest to this disclosure is detection (for the purpose of removal or externalization) of a type of hard-coded strings that that eventually show up as UI text. For example, a hard-coded string may more specifically refer to any text embedded directly in source code of the application and is visible or otherwise exposed to the end-user via an output device (e.g., a display device, a speaker, etc.) and the application's UI. The presented text may be part of a graphical user interface (GUI) element, such as a button, a dialog box, a text box, a menu, a status bar, etc. In other words, a hard-coded string may refer to any text that is embedded in the source code and is also visible to the end-user. However, the embedded form of a hard-coded string may not always look exactly like the text that is eventually presented to the end-user. For example, the hard-coded string, as embedded in the source code, may partially include placeholder text such as string formatting operators (e.g., "% d," "% s," "% n," etc.) that are later replaced with other text at compile-time or at run-time.

The term "localization" may broadly refer to a process of adapting software and/or hardware, which was originally developed for sale in one region or country, for deployment in another region or country. Thus, localization often involves translation of assets, such as text and graphics, from one language to another language. For example, a software product originally developed for use in an English-speaking region may be localized to be marketed and sold in a different region where Spanish is a predominantly spoken language. As another example, video games originally developed in the English language for the U.S. market are often additionally localized into French, Italian, German, and Spanish (colloquially referred to as "FIGS") for the European market.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. Local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control, and administration of databases and control software for performing one or more illustrative aspects describe herein. Data server 103 may be connected to web server 105, through which users interact with and obtain data as requested. Alternatively, data server 103 may act as a web server itself and be directly connected to WAN 101. Data server 103 may be connected to web server 105 through local area network 133, wide area network 101 (e.g., the Internet), via direct or indirect connection, or via some other network. Users may interact with data server 103 using remote computers 107, 109, e.g., using a web browser to connect to data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single physical server.

Each component 103, 105, 107, 109 may be any type of known computer, server, or data processing device. Data server 103 may include, for example, processor 111 controlling overall operation of data server 103. Data server 103 may further include random access memory (RAM) 113, read-only memory (ROM) 115, network interface 117, input/output (I/O) interfaces 119 (e.g., keyboard, mouse, display, printer, etc.), and memory 121. I/O interfaces 119 may include a variety of interface units and drives for reading, writing, displaying, and/or printing data or files. Memory 121 may further store operating system software 123 for controlling overall operation of data processing device 103, control logic 125 for instructing data server 103 to perform aspects described herein, and other application software 127 providing secondary, support, and/or other functionality which may be used in conjunction with aspects described herein. Control logic 125 may also be referred to herein as data server software 125. Functionality of data server software 125 may include operations or decisions made automatically (e.g., without human user intervention) based on rules coded into control logic 125, made manually by a user providing input into the system, and/or a combination of automatic processing based on user input (e.g., queries, data updates, etc.).

Memory 121 may also store data used in performance of one or more aspects described herein, and may include first database 129 and/or second database 131. In some embodiments, first database 129 may include second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or computer-readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Hypertext Markup Language (HTML) or Extensible Markup Language (XML). The computer executable instructions may be stored on a computer-readable medium such as a nonvolatile storage device. Any suitable computer-readable storage media may be utilized, including hard disks, compact disc read-only memories (CD-ROMs), optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits (ICs), field-programmable gate arrays (FPGAs), application-specific integrated circuits (ASICs), virtual machines, and the like. Particular data structures may be used to more effectively implement one or more aspects described herein, and such data structures are contemplated within the scope of computer-executable instructions and computer-usable data described herein.

Figure 2:
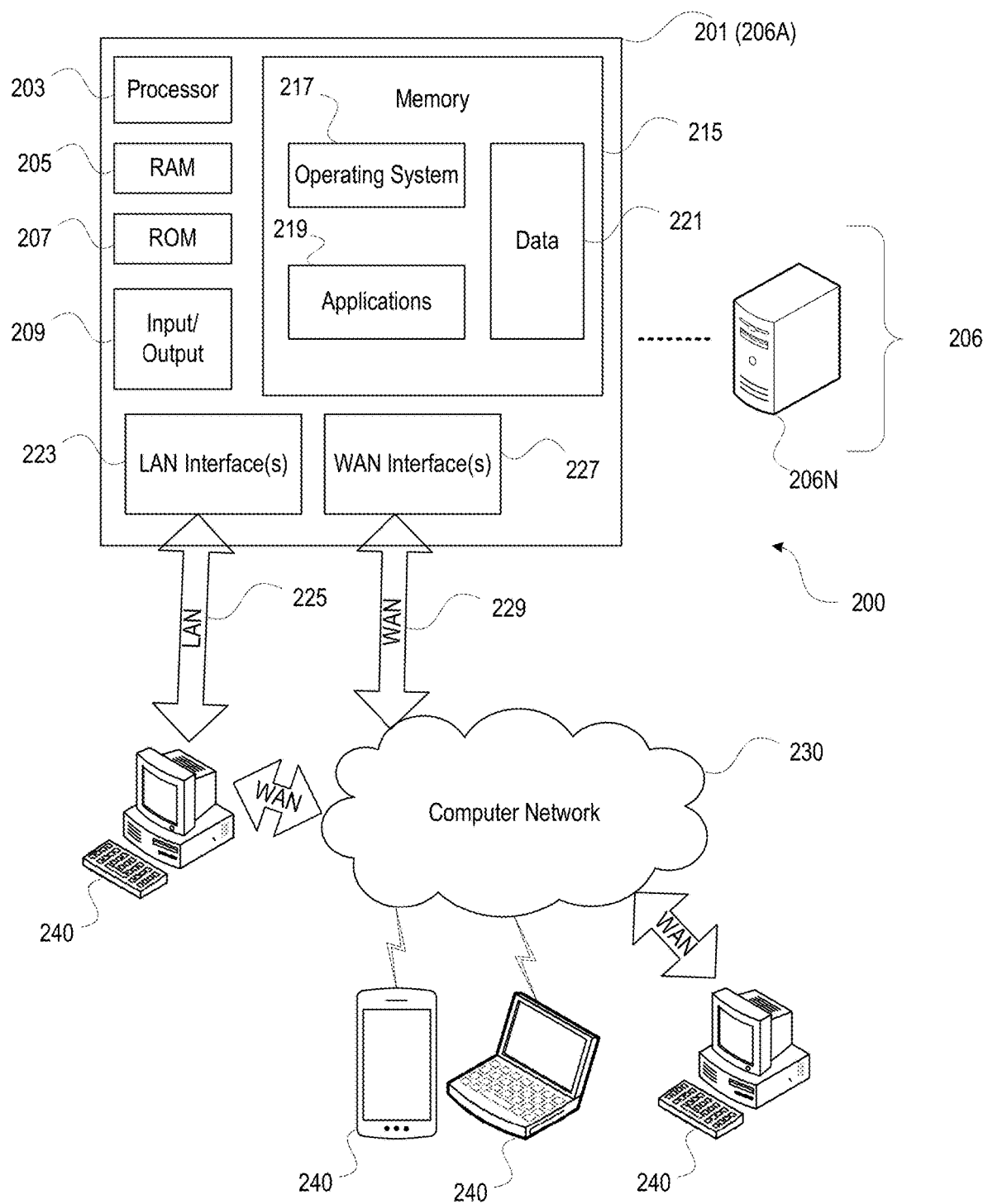
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including computing device 201 in an illustrative computing environment 200 that may be used according to one or more illustrative aspects described herein. Computing device 201 may be used as server 206A in a single-server or multi-server desktop virtualization system (e.g., a remote-access or cloud system) and can be configured to provide virtual machines for client access devices. Computing device 201 may have processor 203 for controlling overall operation of device 201 and its associated components, including RAM 205, ROM 207, input/output (I/O) interfaces 209, and memory 215.

I/O interfaces 209 may include a mouse, a keyboard, a keypad, a touch screen, a scanner, a sensor, an optical reader, a camera, a microphone, a stylus, and/or other input device(s) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special-purpose computing device in order to perform various functions as described herein. For example, memory 215 may store software used by computing device 201, such as operating system 217, application programs 219, and other associated data 221 (e.g., a database).

Computing device 201 may operate in a networked environment supporting connections to one or more remote computers, such as terminals 240 (also referred to as client devices and/or client machines). Terminals 240 may be personal computers (PCs), mobile devices, smartphones, laptop computers, tablets, wearable computing devices, and/ or servers that include some or all of the elements described above with respect to computing device 103 or 201. The network connections depicted in FIG. 2 may include local area network (LAN) 225 and wide area network (WAN) 229, but may also include other networks. When used in a LAN networking environment, computing device 201 may be connected to LAN 225 through a LAN interface or adapter 223 (e.g., a network interface controller). When used in a WAN networking environment, computing device 201 may include a modem or other wide area network interface 227 for establishing communications over WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, a speaker, and antennas (not shown).

Aspects described herein may also be operational with numerous other general-purpose or special-purpose computing system environments or configurations. Examples of other computing systems, environments, and/or configurations that may be suitable for use with aspects described herein may include, but are not limited to, PCs, server computers, hand-held or laptop devices, multiprocessor systems, set-top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206A-206N (generally referred to herein as "server(s) 206"). In one embodiment, computing environment 200 may include a network appliance installed between server(s) 206 and client machine(s) 240. The network appliance may manage client/server connections, and in some cases can load balance client connections amongst a plurality of backend servers 206.

Client machine(s) 240 may in some embodiments be referred to as a single client machine 240 or a single group of client machines 240, while server(s) 206 may be referred to as a single server 206 or a single group of servers 206. In some embodiments a single client machine 240 may communicate with more than one server 206, while in other embodiments, a single server 206 may communicate with more than one client machine 240. In yet other embodiments, a single client machine 240 may communicate with a single server 206.

Client machine 240 may, in some embodiments, be referred to as any one of the following non-exhaustive terms: a client machine, a client, a client computer, a client device, a client access device, a client computing device, a local machine, a remote machine, a client node, an endpoint, an endpoint node, a terminal, a user terminal, a user device, etc. Server 206, in some embodiments, may be referred to as any one of the following non-exhaustive terms: a server, a local machine, a remote machine, a server farm, a host, a host device, a host computing device, etc.

In some embodiments, client machine 240 may be a virtual machine. A virtual machine may refer to a software emulated instance of a physical computer. The virtual machine may be managed by a Type 1 or Type 2 hypervisor, for example, a hypervisor developed by Citrix Systems®, IBM®, VMware®, or any other hypervisor. In some aspects, the hypervisor may execute on server 206 or on client 240.

In some embodiments, client device 240 may display application output generated by an application remotely executing on server 206 or other remotely located machine. In these embodiments, client device 240 may execute a virtual machine receiver program or application to display the output in an application window, a browser, or other output window. In one example, the remotely executed application is a desktop, while in other examples, the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

Server 206, in some embodiments, may use a remote presentation protocol or other program to send data to a thin-client or remote-display application executing on the client to present display output generated by an application executing on server 206. The thin-client or remote-display protocol may be any one of the following non-exhaustive list of protocols: the Independent Computing Architecture (ICA) protocol developed by Citrix Systems, Inc. of Ft. Lauderdale, Fla.; or the Remote Desktop Protocol (RDP) developed by the Microsoft Corporation of Redmond, Wash.

A remote computing environment may include more than one server 206A-206N such that servers 206A-206N are logically grouped together into server farm 206, for example, in a cloud computing environment. Server farm 206 may include servers 206 that are geographically dispersed while logically grouped together, or servers 206 that are located proximate to each other (e.g., housed within the same physical facility) while logically grouped together. Geographically dispersed servers 206A-206N within server farm 206 may, in some embodiments, communicate using a WAN, a MAN, or a LAN, where different geographic regions may be characterized as: different continents, different regions of a continent, different countries, different states, different cities, different campuses, different buildings, different rooms, or any combination of the preceding geographical locations. In some embodiments, server farm 206 may be administered as a single entity, while in other embodiments, server farm 206 may include multiple server farms.

In some embodiments, a server farm may include servers 206 that execute a substantially similar type of operating system platform (e.g., Windows®, macOS®, Unix®, Linux®, iOS®, Android®, Symbian®, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) virtual private network (VPN) server, a firewall, a web server, a master application server, a server executing an active directory, or a server executing an application acceleration program that provides firewall functionality, application functionality, or load balancing functionality. Other server types may also be used.

Some embodiments may include first server 206A that receives requests from client machine 240, forwards the request to second server 206B (not shown), and responds to the request generated by client machine 240 with a response from second server 206B (not shown). First server 206A may acquire an enumeration of applications available to client machine 240 as well as address information associated with application server 206 hosting an application identified within the enumeration of applications. First server 206A may then present a response to the client's request using a web interface, and communicate directly with client 240 to provide client 240 with access to an identified application. One or more clients 240 and/or one or more servers 206 may transmit data over network 230, e.g., network 101.

Figure 3:
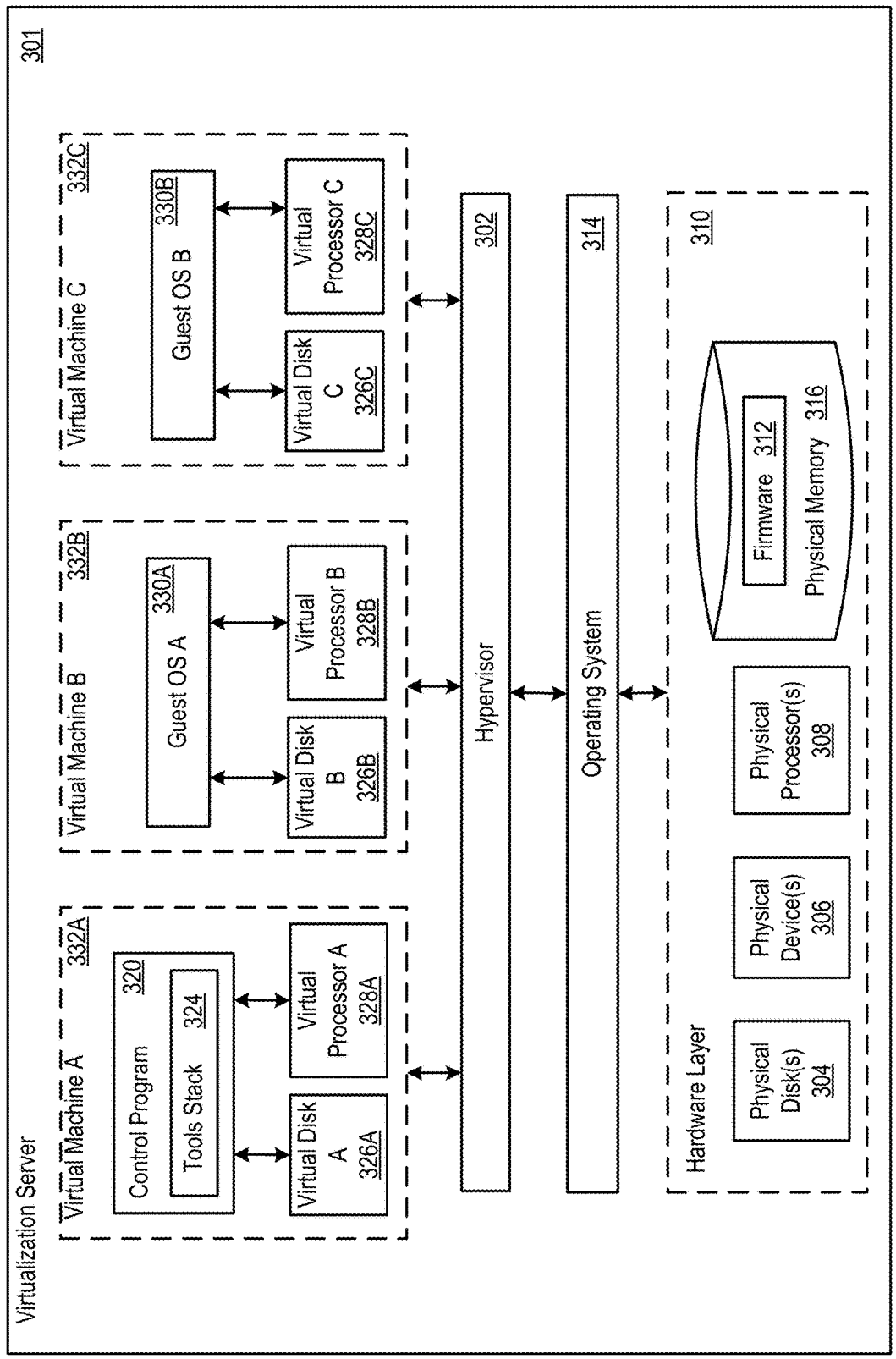
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be a single-server or multi-server system, or a cloud system, including at least one virtualization server 301 configured to provide virtual desktops and/or virtual applications to one or more client access devices 240. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Computer device 301 may be configured as a virtualization server in a virtualization environment, for example, a single-server, multi-server, or cloud computing environment. Virtualization server 301 illustrated in FIG. 3 may be deployed as and/or implemented by one or more embodiments of server 206 illustrated in FIG. 2 or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 3 illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. In some embodiments, virtualization server 301 may execute hypervisor 302 that creates a virtual machine platform on which guest operating systems 330 may execute. In these embodiments, virtualization server 301 may be referred to as a host server. An example of such a virtualization server is Citrix Hypervisor® provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by virtualization server 301 (e.g., any hardware resource available within hardware layer 310). In other embodiments, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 3, virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 3 illustrates an embodiment where virtualization server 301 hosts three virtual machines 332, in other embodiments virtualization server 301 may host any number of virtual machines 332. Hypervisor 302, in some embodiments, may provide each virtual machine 332 with a unique virtual view of the physical hardware, including memory 316, processor 308, and other system resources 304, 306 available to that virtual machine 332. In some embodiments, the unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326, in some embodiments, may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. Thus, in these embodiments, particular virtual disk 326 included in each virtual machine 332 may be unique when compared with other virtual disks 326.

Virtual processor 328 may be a virtualized view of one or more physical processors 308 of virtualization server 301. In some embodiments, the virtualized view of physical processors 308 may be generated, provided, and managed by hypervisor 302. In some embodiments, virtual processor 328 may have substantially all of the same characteristics of at least one physical processor 308. In other embodiments, virtual processor 328 may provide a modified view of physical processors 308 such that at least some of the characteristics of virtual processor 328 are different from the characteristics of the corresponding physical processor 308.

Detection of Hard-Coded Strings in Source Code

Figure 4A:
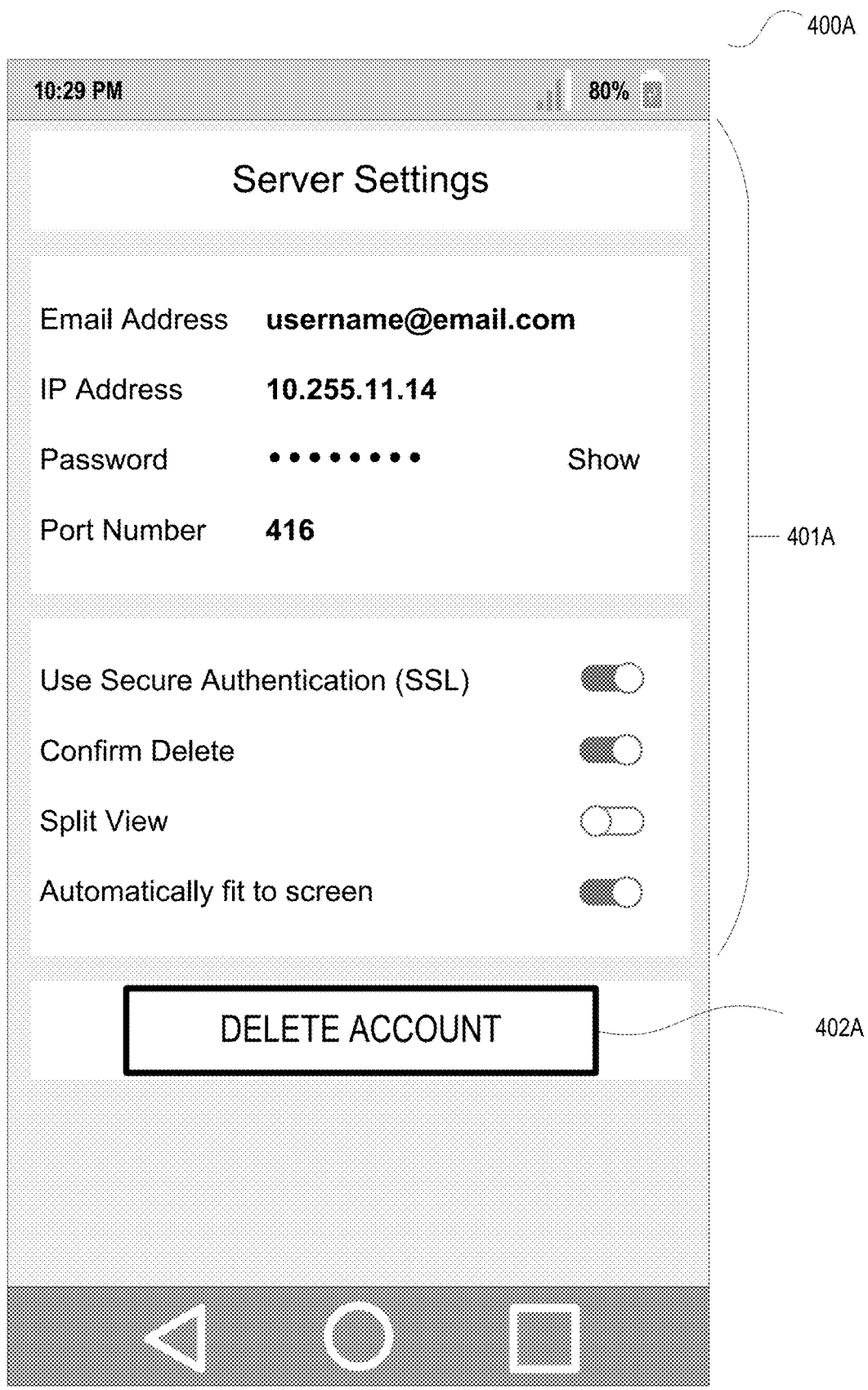
FIG. 4A depicts an illustrative graphical user interface that is rendered in English.

FIG. 4A depicts an illustrative graphical user interface that is rendered in English. Specifically, depicted in the figure is user interface screen 400A of an example mobile application. User interface screen 400A is configured for the "en-US" (English-United States) locale. Thus, the GUI is rendered in English, as shown by various GUI elements 401A, 402A. A developer of the application may have chosen to store the text assets (e.g., strings) in a file that is separate from the source code of the application. For example, all the localized strings corresponding to the "en-US" locale may have been stored in a resource file named "stringtable_en-US.xml" apart from the associated source code file named "com.mycompany.myapp.java." When UI screen 400A is rendered, the machine code for rendering the screen may access "stringtable_en-US.xml" in runtime to retrieve appropriate string assets and populate the UI screen 400A with the retrieved string assets. Alternatively, the string assets of "stringtable_en-US.xml" may be retrieved during compile time and embedded in the resulting machine code.

Figure 4B:
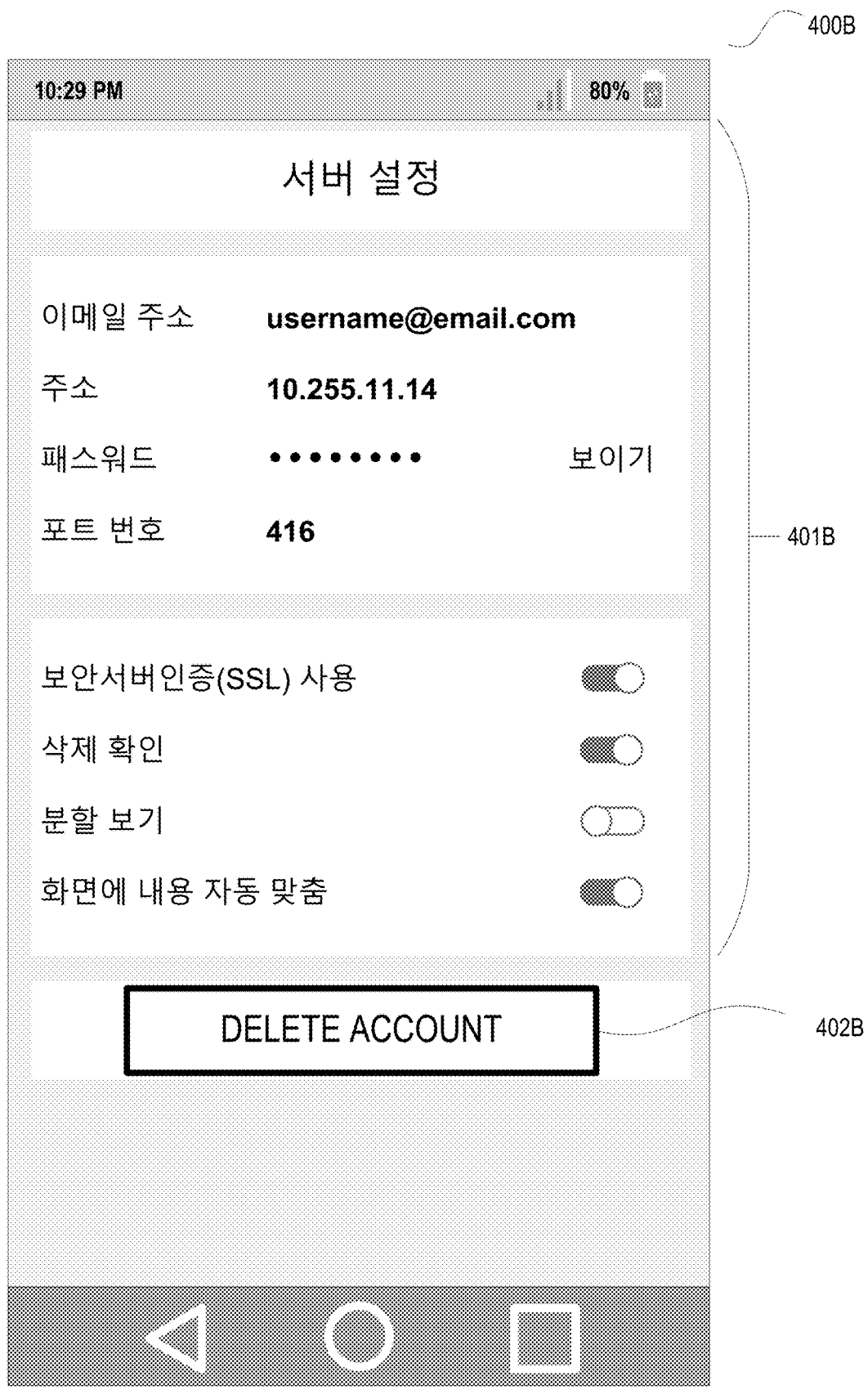
FIG. 4B depicts an illustrative graphical user interface that is rendered for a non-English locale.

FIG. 4B depicts an illustrative graphical user interface that is rendered for a non-English locale. In particular, user interface screen 400B may be equivalent to user interface screen 400A of FIG. 4A but is configured for the "kr-KR" (Korean-Korea) locale, which is a non-English locale. The developer of the application may have chosen to store the text assets (e.g., localized strings) in a file that is separate from the source code of the application. For example, all the localized strings corresponding to the "KR" (Korea) locale may have been stored a resource file named "stringtable_kr-KR.xml" apart from the source code. However, even though a major portion of the UI is illustrated in FIG. 4B as being rendered in the Korean language, as exemplified by GUI elements 401, some element such as GUI element 402B is still featuring a string asset in English. This may likely be a result of the text asset corresponding to GUI element 402B being directly embedded ("hard-coded") into the source code instead of being stored and retrieved from the separate resource file "stringtable_kr-KR.xml." This type of error may not always affect functionality of the application, encountering such non-conforming GUI elements may be jarring to the end-user and thus negatively affect the overall user experience.

As this example illustrates, having such hard-coded strings embedded throughout the source code may make it very difficult and costly to maintain the code or to adapt the code for localization. The problem is further compounded when, as is a common practice in the software industry, the source code is written by software engineers while the translation work is performed by translators who are more linguistically minded. The software engineers and developers are typically not capable of fixing translation errors in their source code, and the translators may not be given access to directly edit the source code in order to prevent unauthorized and/or inadvertent tampering. It is also a common practice for software manufacturers to create a software product for a domestic market (e.g., North America) first, and then later make a business decision to create versions of the software for international markets (e.g., Europe, Asia, Africa, etc.). If some or all of the UI-exposed string assets (i.e., string assets that will be visible to end-users via a UI) happen to be hard-coded into the original source code, localizing the software for the international markets may become significantly costlier and more inefficient because one may be required to identify every instance of hard-coded strings across multiple source code files and modify them in a consistent manner. This process will likely need to be repeated every time a new locale is added to the software or any incremental updates are needed for the string assets. The source code itself may become bloated with an excessive amount of conditional statements required to handle multiple versions of string assets.

Figure 5A:
FIGS. 5A and 5B depict example code snippets.
Figure 5B:
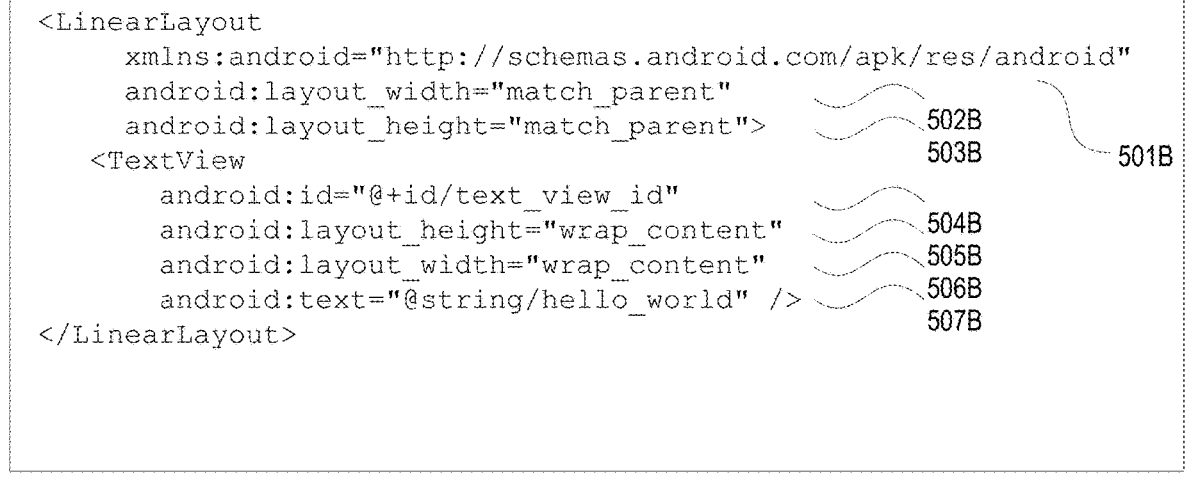

FIGS. 5A and 5B depict example code snippets. In particular, code 500A of FIG. 5A and code 500B of FIG. 5B may each be a snippet from an XML file that defines a layout of a GUI view for a mobile application. For example, code 500A contains several string literals 501A through 507A. However, string literals 501A through 506B may be various parameters that are only used internally within the application while string literal 507A ("Hello World") may be a hard-coded text string that is displayed to the end-user via the GUI. Code 500B of FIG. 5A is similar to code 500A but string literal 507B of code 500B is now replaced with a parameter that references a resource file (e.g., a string table "@ string") and a key (e.g., "hello_world"). The disclosure will now turn to descriptions of various embodiments for detecting hard-coded strings in source code.

Figure 6:
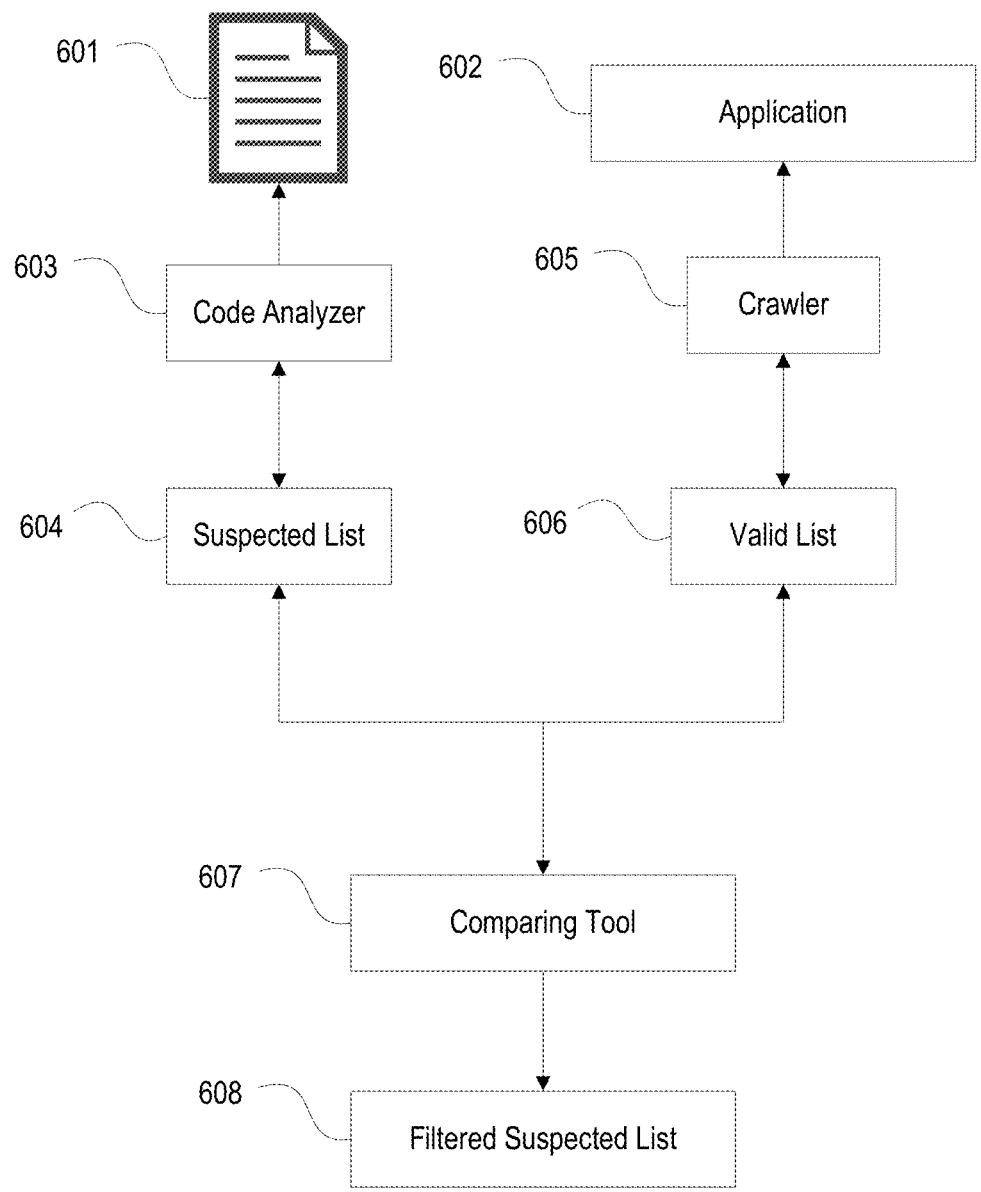
FIG. 6 is a flow chart for an example method of analyzing source code and generating a suspected list of hard-coded strings.

FIG. 6 is a block diagram showing an example system for detecting hard-coded strings in source code. Code analyzer 603 may analyze source code 601 of application 602 to generate suspected list 604 of hard-coded strings. Specifically, code analyzer 603 may scan and parse source code 601, generate an abstract syntax tree (601), and perform result filtering to create suspected list 604 of hard-coded string candidates. Details of the code analysis will be described below in more detail. Suspected list 604 may contain many hard-coded string candidates but may also contain numerous false-positives because the static code analysis alone may not be capable of distinguishing between hard-coded string literals that would eventually be exposed to the end-user via a UI and strings that are merely used internally.

Subsequently or concurrently, crawler 605 may be used to extract text from application 602 in runtime. For example, application 602 may be a web application and crawler 605 may be an automation framework (e.g., automated web browser) that crawls through all the available links to retrieve webpages and collect text from the retrieved webpages. In another example, application 602 may be a mobile or desktop application, crawler 605 may inject one or more hooks into a UI renderer within application 602 or an underlying platform (e.g., operating system) that application 602 is running on, and extract text that is displayed or otherwise presented to the end-user via a UI. Crawler 605 may ensure that every possible page, view, or interface is traversed and collected. The text strings collected by crawler 605 may be stored as valid list 606 of strings. Suspected list 604 and valid list 606 may be stored in the same database or in separate databases.

Comparing tool 607 may access suspected list 604 and valid list 606 to perform comparison and filtering. Particularly, comparison tool 607 may go through the strings contained in suspected list 604 and determine whether identical strings also exist in valid list 606. Additional string processing may be necessary for accurate comparison. For example, any formatting operators (e.g., "% d," "% s," "% n," etc.) found in the strings in suspected list 604 may need to be taken into account when finding a match (e.g., equivalence or correspondence, but not necessarily an exact match) in valid list 606. Any concatenation operators ("+") that are used to connect two or more strings together may also be taken in to account. More specifically, comparing tool 607 may determine that the string "Welcome, % s, to the Home Screen. Today is % s, % s % d, % d." in suspected list 604 is a match for the string "Welcome, John, to the Home Screen. Today is Tuesday, Aug. 26, 2014." found in valid list 606. If a match is found between a string in suspected list 604 and a string in valid list 606, the string may be regarded as a hard-coded string of interest that needs to be flagged by inclusion in filtered suspected list 608. In other words, this hard-coded string is something that does get exposed to the end-user via the UI and therefore will need to be addressed by the developer (e.g., removed, externalized to a resource file, etc.). If no match is found for a string in suspected list 604 compared to valid list 604, such string may be regarded as a false-positive hard-coded string (e.g., a log message, an error message, a debug message, an exception, a comment, a parameter, etc.), and may be removed or filtered out from suspected list 604. After the comparison is completed, any remaining and unfiltered strings in suspected list 607 may be considered hard-coded strings of interest and included in filtered suspected list 608.

Components depicted in FIG. 6 may represent separate devices, such as any number of devices described above (e.g., network nodes 103, 105, 107, 109, server 206, terminals 240, server 301, etc.), or some of the components may be integrated into one or more such devices. For example, code analyzer 603 may be part of one device (e.g., a computer, a workstation, a server, a smartphone, a tablet device, etc.) while comparing tool 607 may be part of another device (e.g., a computer, a workstation, a server, a smartphone, a tablet device, etc.). Crawler 605 and application 602 may also execute on different devices from each other and/or from devices on which code analyzer 603 and comparing tool 607 are executing. Alternatively, one or more of these components may execute on the same device. Various components depicted in FIG. 6 may be implemented with hardware (e.g., a circuit, a processor, a controller, storage, etc.), software (e.g., instructions, code, a program, an application, etc.), and/or both. For example, one or more of application 602, code analyzer 603, crawler 605, and comparing tool 608 may comprise instructions stored on a computer-readable storage medium and configured to be executed by a processor to perform various operations associated with their respective functions. The various operations depicted in FIG. 6 may be integrated as a phase in a continuous integration (CI) process of product development and be run automatically for each build or release. Issue reports (e.g., filtered suspected list 608) may be generated for review by the developers after the phase.

Figure 7:
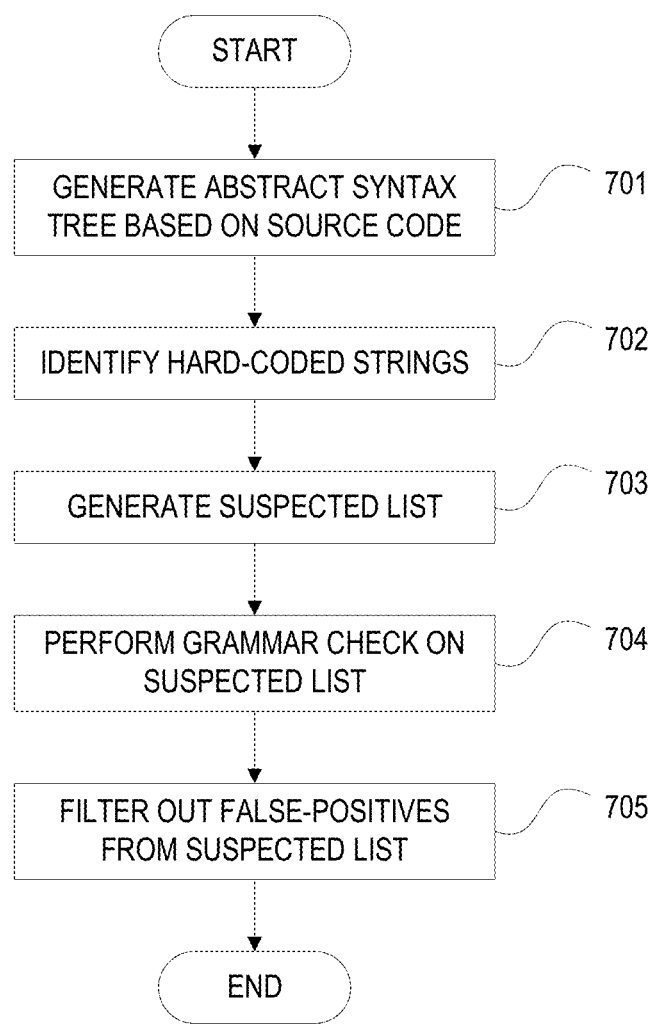
FIG. 7 is a flow chart for an example method of analyzing source code and generating a suspected list of hard-coded strings.
Figure 9:
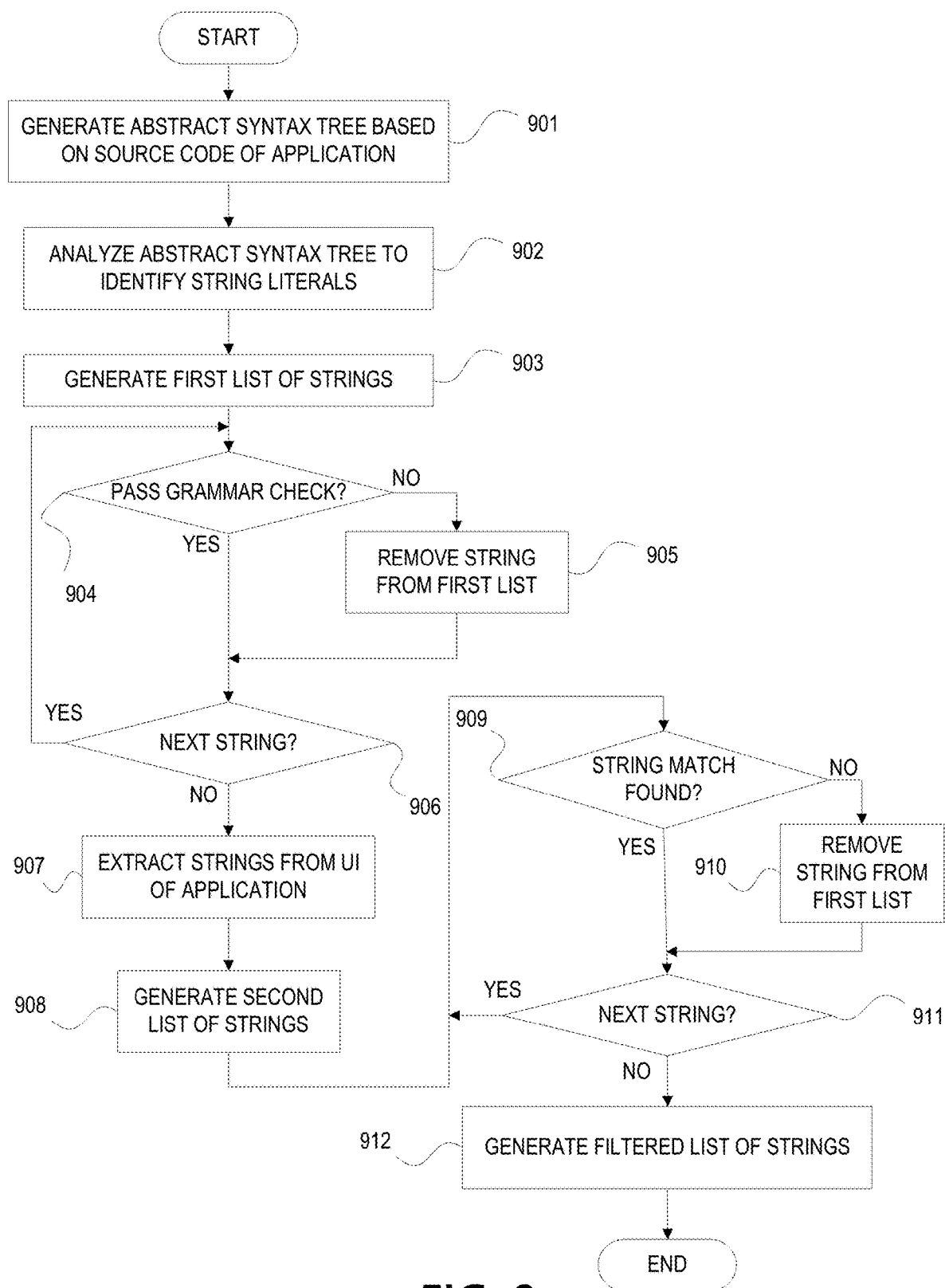
FIG. 9 is a flow chart for an example method of detecting hard-coded strings in source code.

Having disclosed some basic system components and concepts, FIGS. 7 and 9 illustrate methods that may be performed to implement various features described herein. Any of the steps disclosed herein may be performed by any of the devices or components that were heretofore described, including but not limited to network nodes 103, 105, 107, 109, server 206, terminals 240, server 301, etc. The steps outlined herein are exemplary and can be implemented in any combination thereof, including combinations that exclude, add, or modify certain steps.

FIG. 7 is a flow chart for an example method of analyzing source code and generating a suspected list of hard-coded strings. In particular, the example method of claim 7 may be performed wholly or partially by code analyzer 603, but it may also be performed wholly or partially by other devices or components heretofore described. At step 701, code analyzer 603 may generate an abstract syntax tree (AST) based on source code 601. Specifically, code analyzer 603 may perform code analysis on source code 601 to generate one or more ASTs. An AST may be a tree representation of the syntactic structure of source code 601. Thus, source code 601 may be scanned and parsed to identify, through the use of the AST, various syntactic constructs (e.g., expressions, identifiers, operators, literals, etc.) and their positions within source code 601. At step 702, code analyzer 603 may analyze the generated AST to identify all hard-coded strings within source code 601. At step 703, code analyzer 603 may generate suspected list 604 based on the identified hard-coded strings from source code 601.

Optionally, at steps 704 and 705, code analyzer 603 may perform grammar check on the strings in suspected list 604 and filter out any false-positive results from suspected list 604. False-positive results may be strings that were initially suspected to be hard-coded strings but later found to be not visible to the user in the end-product. Examples of false-positive results may include debug messages, error messages, log messages, exceptions, comments, parameters, and other string literals for internal use. Grammar check performed at step 704 may include a lexical analysis, a syntax analysis, a spelling check, etc. to determine whether the strings in suspected list 604 conform to the natural language rules of the target language. For example, if the target locale or target language of the application is English, then the strings in suspected list 604 may be inspected to determine if they conform to the rules of English grammar and spelling. The strings that do not pass the grammar and/or spelling test may be regarded as false-positives and discarded or filtered out from suspected list 604 because grammatically incorrect or misspelled statements are less likely to be presented to the end-user and more likely to be text for internal use. For example, strings such as "systemerror"; "c:\Windows\Program Files\MyApplication\bin\"; "appMain.cpp"; "option_print_collate"; "exception_divided_by_zero"; "Something went wrong. ErrorCode:907"; "Warning: FIX_THIS_CODE_NOW"; etc. may be identified as false-positives after failing to pass the grammar and/or spelling check. Code analyzer 603 may recognize any formatting operators, concatenation operators, and others to apply the grammar/spelling check more intelligently. For example, a formatting operator "% d" embedded in a string may not be treated as a grammatical or spelling error. Optionally, in order to increase accuracy, a human inspector may manually inspect the strings flagged by this process as potential false-positives and weed out strings that are erroneously flagged as false-negatives before they are thrown out.

FIG. 8A illustrates an example code snippet, based on which an AST is generated. Code analyzer 603 may scan in the code, parse it into constituent elements, and generate one or more ASTs. FIG. 8B illustrates an example AST generated based on code of FIG. 8A. Notably, according to this example AST, the string 'Listening on' is identified as a literal that starts at position 76 and ends at position 91 in the line.

FIG. 9 is a flow chart for an example method of detecting hard-coded strings in source code. At step 901, an AST may be generated based on source code of an application. At step 902, the AST may be analyzed to identify string literals contained in the source code. Based on the identified string literals, a first list of strings is generated at step 903. The first list of strings may be a suspected list of strings.

At step 904, it is determined whether a string in the first list of strings passes a grammar check. If the string passes the grammar check (904—YES), the method proceeds to step 906. The grammar check may determine whether the string satisfies a predetermined set of grammar and/or spelling rules. If, however, the string fails the grammar check (904—NO), the failed string may be removed from the first list of strings at step 905. In other words, at least one false-positive string literals that does not satisfy predetermined grammatical criteria may be filtered out from the string literals embedded in the source code. The false-positive string literal may be a string literal used in an internal message of the application. The internal message may be a debug message, an error message, a log message, an exception, a comment, and/or a parameter.

If there are more strings in the first list of strings to perform grammar check on (906—YES), then the method returns to step 904 and process the next string. If the end of the first list is reached (906—NO), then the method proceeds to step 907. Steps 904, 905, 906 related to the grammar check may be optional or performed at a different time (e.g., after step 912).

At step 907, strings are extracted from a UI of the application. The strings may be extracted by at least one of a crawler, an automation framework, or a hook. At step 908, a second list of strings may be generated based on the extracted strings. In other words, the second list of strings may include strings that are rendered via a user interface of the application. The second list of strings may be a valid list of strings.

At step 909, a comparison is made between the first list of strings and the second list of strings, and if a match is found between a string in the first list of strings and a string in the second list of strings (909—YES), the method proceeds to step 911. If no match is found for the string in the first of strings relative to the second list of strings (909—NO), then at step 910, the string that does not have a match in the second list of strings (e.g., false-positive result) is removed from the first list of strings. The false-positive string literal may be a string literal used in an internal message of the application. If there are more strings in the first list of strings to perform comparison on (911—YES), then the method returns to step 909 and process the next string in the first list of strings. However, if the end of the first list is reached (911—NO), then the method proceeds to step 912, where a filtered list of strings is generated based on the first list of strings and the second list of strings. Specifically, the filtered list of strings may contain string literals that are (i) embedded in the source code of the application, and (ii) rendered via the user interface of the application. These strings identified through one or more filtering processes may be considered hard-coded strings that require removal and/or externalization from the source code and are reported to a user (e.g., a developer) for further processing. The filtered list of strings may include multiple entries, each entry including a string, a position within source code, a unique identifier, etc.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
generating, via a processor, a first list of strings that are embedded in source code of an application;
generating a second list of strings that are rendered via a user interface of the application;
comparing each string of the first list of strings against the second list of strings; and
generating, based on the comparison, a filtered list of strings by removing, from the first list of strings, at least one string that does not have a match in the second list of strings, wherein the filtered list of strings comprises strings that are hard-coded into the source code of the application and are rendered via the user interface of the application.

2. The method of claim 1, wherein generating the second list of strings comprises extracting, by at least one of a crawler, an automation framework, or a hook, strings that are rendered via the user interface of the application.

3. The method of claim 1, wherein generating the first list of strings comprises:
generating, based on the source code, an abstract syntax tree; and
analyzing the abstract syntax tree to identify the first list of strings embedded in the source code.

4. The method of claim 1, wherein generating the first list of strings comprises filtering out, from strings embedded in the source code, at least one false-positive string that does not satisfy grammatical criteria.

5. The method of claim 1, wherein the comparison is based on at least one of a formatting operator or a concatenation operator.

6. The method of claim 1, wherein the generating the first list of strings comprises filtering out, from strings embedded in the source code, at least one false-positive string that is used in an internal message of the application.

7. The method of claim 6, wherein the internal message comprises at least one of a debug message, an error message, a log message, an exception, a comment, or a parameter.

8. A system comprising:
one or more processors; and
memory storing instructions that, when executed by the one or more processors, cause the system to:
generate a first list of strings that are embedded in source code of an application;
generate a second list of strings that are rendered via a user interface of the application;
compare each string of the first list of strings against the second list of strings; and
generate, based on the comparison, a filtered list of strings by removing, from the first list of strings, at least one string that does not have a match in the second list of strings, wherein the filtered list of strings comprises strings that are hard-coded into the source code of the application and are rendered via the user interface of the application.

9. The system of claim 8, wherein, to generate the second list of strings, the instructions, when executed by the one or more processors, further cause the system to extract, by at least one of a crawler, an automation framework, or a hook, strings that are rendered via the user interface of the application.

10. The system of claim 8, wherein, to generate the first list of strings, the instructions, when executed by the one or more processors, further cause the system to:
generate, based on the source code, an abstract syntax tree; and
analyze the abstract syntax tree to identify the first list of strings embedded in the source code.

11. The system of claim 8, wherein, to generate the first list of strings, the instructions, when executed by the one or more processors, further cause the system to filter out, from strings embedded in the source code, at least one false-positive string that does not satisfy grammatical criteria.

12. The system of claim 8, wherein the comparison based on at least one of a formatting operator or a concatenation operator.

13. The system of claim 8, wherein, to generate the first list of strings, the instructions, when executed by the one or more processors, further cause the system to filter out, from strings embedded in the source code, at least one false-positive string that is used in an internal message of the application.

14. The system of claim 13, wherein the internal message comprises at least one of a debug message, an error message, a log message, an exception, a comment, or a parameter.

15. A non-transitory computer-readable medium storing instructions that, when executed by a computing device, cause the computing device to:
generate a first list of strings that are embedded in source code of an application;
generate a second list of strings that are rendered via a user interface of the application;
compare each string of the first list of strings against the second list of strings; and
generate, based on the comparison, a filtered list of strings by removing, from the first list of strings, at least one string that does not have a match in the second list of strings, wherein the filtered list of strings comprises strings that are hard-coded into the source code of the application and are rendered via the user interface of the application.

16. The non-transitory computer-readable medium of claim 15, wherein, to generate the second list of strings, the instructions, when executed by the computing device, further cause the computing device to extract, by at least one of a crawler, an automation framework, or a hook, strings that are rendered via the user interface of the application.

17. The non-transitory computer-readable medium of claim 15, wherein, to generate the first list of strings, the instructions, when executed by the computing device, further cause the computing device to:
generate, based on the source code, an abstract syntax tree; and
analyze the abstract syntax tree to identify the first list of strings embedded in the source code.

18. The non-transitory computer-readable medium of claim 15, wherein, to generate the first list of strings, the instructions, when executed by the computing device, further cause the computing device to filter out, from strings embedded in the source code, at least one false-positive string that does not satisfy grammatical criteria.

19. The non-transitory computer-readable medium of claim 15, wherein the comparison is based on at least one of a formatting operator or a concatenation operator.

20. The non-transitory computer-readable medium of claim 15, wherein, to generate the first list of strings, the instructions, when executed by the computing device, further cause the computing device to filter out, from strings embedded in the source code, at least one false-positive string that is used in at least one of a debug message, an error message, a log message, an exception, a comment, or a parameter.

\* \* \* \* \*